(12) United States Patent
Poppen et al.

(10) Patent No.: US 8,311,737 B2
(45) Date of Patent: Nov. 13, 2012

(54) AUTOMATED PRIORITIZATION OF MAP OBJECTS

(75) Inventors: Richard F. Poppen, San Jose, CA (US); Eric Wels, Boulder Creek, CA (US); David Hunkins, San Francisco, CA (US)

(73) Assignee: deCarta Inc., San Jose, CA (US)

( * ) Notice: Subject to any disclaimer, the term of this patent is extended or adjusted under 35 U.S.C. 154(b) by 1847 days.

(21) Appl. No.: 11/187,638

(22) Filed: Jul. 22, 2005

(65) Prior Publication Data

US 2006/0041376 A1  Feb. 23, 2006

Related U.S. Application Data

(60) Provisional application No. 60/590,667, filed on Jul. 23, 2004.

(51) Int. Cl.
  *G08G 1/123* (2006.01)
(52) U.S. Cl. ........ 701/454; 701/438; 701/447; 701/532; 340/995.24; 340/990; 340/995.1; 715/700
(58) Field of Classification Search .................. 701/208, 701/211–212, 454, 438, 532, 447; 704/4, 704/8; 380/1, 30; 715/700, 207, 205, 255, 715/E17.1; 340/995.1, 995.14, 995.24, 995.17, 340/995.27, 990; 707/3, 5, E17.9, 999.003, 707/708, 710, E17.108, 748–750, E17.058; 342/357.06, 357.01; 455/456.5
See application file for complete search history.

(56) References Cited

U.S. PATENT DOCUMENTS

| | | | | |
|---|---|---|---|---|
| 4,974,191 A * | 11/1990 | Amirghodsi et al. | ............. | 704/8 |
| 5,177,685 A * | 1/1993 | Davis et al. | ................ | 455/456.5 |
| 5,580,252 A * | 12/1996 | McCrady | ...................... | 434/128 |
| 5,884,218 A * | 3/1999 | Nimura et al. | ................ | 701/208 |
| 6,263,335 B1 * | 7/2001 | Paik et al. | .......................... | 707/5 |
| 6,457,018 B1 * | 9/2002 | Rubin | ..................................... | 1/1 |
| 6,735,578 B2 * | 5/2004 | Shetty et al. | .................... | 706/16 |
| 6,763,349 B1 * | 7/2004 | Sacco | ................................... | 1/1 |
| 6,983,203 B1 * | 1/2006 | Wako | ............................ | 701/208 |

(Continued)

FOREIGN PATENT DOCUMENTS

EP  1357356 A2 * 10/2003

(Continued)

OTHER PUBLICATIONS

"An Intelligent Relationship with Your Data Base", Personal Computing, Jul. 1984, pp. 32-34.*

(Continued)

*Primary Examiner* — Cuong H Nguyen
(74) *Attorney, Agent, or Firm* — Fenwick & West LLP

(57) ABSTRACT

Automatic map generation is enabled by assigning priorities to each city in a list of cities under consideration for display on a map. A mapping engine determines a reference count for each city, indicating how frequently the city appears in one or more corpora of documents. Based on the reference count, and optionally upon other data such as population and political importance, a priority score is assigned to each city. Each city is then assigned to one of a plurality of categories according to the city's priority score. A map is then generated including cities from a specified highest number of categories. In one embodiment, cities from a higher-scored category are presented in a more significant way, e.g., in capital letters, bold type, etc., than are those in the next-highest scored category.

24 Claims, 2 Drawing Sheets

U.S. PATENT DOCUMENTS

| | | | | |
|---|---|---|---|---|
| 7,133,862 | B2 * | 11/2006 | Hubert et al. | 1/1 |
| 7,164,987 | B2 * | 1/2007 | Watanabe et al. | 701/208 |
| 7,243,304 | B2 * | 7/2007 | Sato | 715/246 |
| 7,340,451 | B2 * | 3/2008 | Sacco | 707/694 |
| 7,373,246 | B2 * | 5/2008 | O'Clair | 701/208 |
| 7,401,087 | B2 * | 7/2008 | Copperman et al. | 707/737 |
| 7,680,594 | B2 * | 3/2010 | Cabral et al. | 701/423 |
| 7,685,224 | B2 * | 3/2010 | Nye | 709/201 |
| 7,818,121 | B2 * | 10/2010 | Uyeki et al. | 701/413 |
| 7,877,206 | B2 * | 1/2011 | Cabral et al. | 701/414 |
| 7,881,863 | B2 * | 2/2011 | Uyeki et al. | 701/414 |
| 7,979,206 | B2 * | 7/2011 | Uyeki et al. | 701/414 |
| 8,005,609 | B2 * | 8/2011 | Uyeki et al. | 701/117 |
| 8,046,166 | B2 * | 10/2011 | Cabral et al. | 701/461 |
| 8,055,443 | B1 * | 11/2011 | Uyeki et al. | 701/414 |
| 8,145,421 | B2 * | 3/2012 | Tabata | 701/408 |
| 2002/0078035 | A1 * | 6/2002 | Frank et al. | 707/3 |
| 2003/0171871 | A1 * | 9/2003 | Tabata | 701/207 |
| 2003/0191626 | A1 * | 10/2003 | Al-Onaizan et al. | 704/8 |
| 2004/0102897 | A1 * | 5/2004 | Watanabe et al. | 701/208 |
| 2004/0193593 | A1 * | 9/2004 | Sacco | 707/3 |
| 2005/0125440 | A1 * | 6/2005 | Hirst | 707/103 R |
| 2006/0005113 | A1 * | 1/2006 | Baluja et al. | 715/501.1 |
| 2006/0041376 | A1 * | 2/2006 | Poppen et al. | 701/208 |
| 2006/0234319 | A1 * | 10/2006 | Kakui | 435/7.23 |
| 2006/0271280 | A1 * | 11/2006 | O'Clair | 701/208 |
| 2007/0005243 | A1 * | 1/2007 | Horvitz et al. | 701/213 |
| 2008/0167798 | A1 * | 7/2008 | Tertoolen | 701/200 |
| 2008/0228392 | A1 * | 9/2008 | Fuchs | 701/208 |

FOREIGN PATENT DOCUMENTS

| | | | |
|---|---|---|---|
| EP | 1776560 B1 * | 11/2011 | |
| JP | 06317648 A * | 11/1994 | |
| JP | 2003254760 A * | 9/2003 | |
| KR | 2010115968 A * | 10/2010 | |
| WO | WO 01/63479 A1 | 8/2001 | |
| WO | WO 2006012566 A2 * | 2/2006 | |
| WO | WO 2010071317 A2 * | 6/2010 | |

OTHER PUBLICATIONS

"Conceptual Clustering of Structured Objects: A Goal-Oriented Approach", Artificial Intelligence, vol. 28, 1986, pp. 43-69.*

P. Ipeirotis, L. Gravano, and M. Sahami, "Probe, Count, and Classify: Categorizing Hidden-Web Databases", Proceedings of the 2001 ACM SIGMOD International Conference on Management of Data, 2001.*

Shi-Kuo Chang and Taieb Znati, "Adlet: Active Document for Adaptive Information Integration", available on the Internet Jul. 2001 at http://www.cs.pitt.edu/.about.chang/365/adlet.html.*

"Searchandfind, Inxight Thing Finder SDK", Inxight Software, Inc., ThingFinder SDK Data Sheet, available on the Internet Apr. 2001 at http://www.inxight.com/pdfs/products/tf.sub.--sdk.sub.--ds.pdf.*

Uniform frequency images: adding geometry to images to produce space-efficient textures; Hunter, A.; Cohen, J.D.; Visualization 2000. Proceedings; Digital Object Identifier: 10.1109/VISUAL.2000. 885701; Publication Year: 2000, pp. 243-250.*

FOLKSOMAPS—towards community driven intelligent maps for developing regions; Kumar, A.; Chakraborty, D.; Chauhan, H.; Agarwal, S.K.; Rajput, N.; Information and Communication Technologies and Development (ICTD), 2009 International Conference on; Digital Object Identifier: 10.1109/ICTD.2009.5426701; Publication Year: 2009, pp. 85-94.*

GADGET/IV: a taxonomic approach to semi-automatic design of information visualization applications using modular visualization environment; Fujishiro, I. et al.; Information Visualization, 2000. InfoVis 2000. IEEE Symposium on; Digital Object Identifier: 10.1109/INFVIS.2000.885093; Publication Year: 2000, pp. 77-83.*

Mapping and visualising digital presence; Papapavlou, K.; Linardou, O.; Fatah, A.; Turner, A.; Intelligent Environments, 2008 IET 4th International Conference on; Publication Year: 2008, pp. 1-4.*

Coordinated and Multiple Views for Visualizing Text Collections; Eler, D.M.; Paulovich, F.V.; Oliveira, M.; Minghim, R.; Information Visualisation, 2008. IV '08. 12th International Conference; Digital Object Identifier: 10.1109/IV.2008.39 Publication Year: 2008, pp. 246-251.*

Evaluating the impact of recovery density on augmented reality tracking; Coffin, Christopher; Lee, Cha; Hollerer, Tobias; Mixed and Augmented Reality (ISMAR), 2011 10th IEEE International Symposium on; Digital Object Identifier: 10.1109/ISMAR.2011. 6092374; Publication Year: 2011, pp. 93-101.*

Unsupervised semantic annotation of Web service datatypes; Chifu, E.S.; Letia, I.A.; Intelligent Computer Communication and Processing (ICCP), 2010 IEEE International Conference on; Digital Object Identifier: 10.1109/ICCP.2010.5606464 Publication Year: 2010, pp. 43-50.*

Autonomous sign reading for semantic mapping; Case, C.; Suresh, B.; Coates, A.; Ng, A.Y.; Robotics and Automation (ICRA), 2011 IEEE International Conference on; Digital Object Identifier: 10.1109/ICRA.2011.5980523; Publication Year: 2011, pp. 3297-3303.*

"International Preliminary Report on Patentability", PCT/US2005/ 026174, Feb. 28, 2007, pp. 1-4.

Cobb, D.A. et al., "Online GIS Service," The Journal of Academic Librarianship, Nov. 1997, pp. 484-497.

European Extended Search Report, European Application No. 05775529.0, May 21, 2010, 5 pages.

* cited by examiner

AUTOMATED PRIORITIZATION OF MAP OBJECTS

CROSS-REFERENCE TO RELATED APPLICATIONS

This application claims the benefit of U.S. Provisional Application 60/590,667, filed Jul. 23, 2004, and which is incorporated by reference herein in its entirety.

BACKGROUND OF THE INVENTION

1. Field of the Invention

The present invention relates generally to computerized cartography. In particular, the present invention is directed to automatically assigning priorities to elements of a map based on properties of those elements.

2. Description of the Related Art

In making maps of states, provinces, countries, or regions, whether by hand or by using a computer program, it is a common practice to display cities as labeled points. Because not all cities are equally significant, cities are prioritized. More important cities—that is, cities that are more likely to be searched for on a map by a wide audience—are displayed and labeled; less important cities are displayed and labeled only where they do not interfere with the display of more important cities. Typically, when cities of various priorities are displayed, the most important cities are displayed with a larger or bolder symbol, and their names are displayed in larger or bolder type, or in all capital letters.

The most common method of assigning priorities to cities is by population. Cities of population greater than some number $p_1$ are shown most prominently; cities with population less than $p_1$ but greater than some number $p_2$ are shown less prominently; cities with population less than $p_2$ but greater than some number $p_3$ are shown still less prominently; and so on, until cities with population less than some number $p_n$ are not shown at all.

However, a purely population-based method of assigning priorities is not always optimal. Some cities are important despite having small populations. For example, one typically expects to find a country's capital city on a map that includes that country. The capital of the United States, Washington, D.C., had a population of 572,059 in the 2000 census, making it only the 21st largest city in the United States—smaller than the city of Milwaukee, Wis., the $19^{th}$ largest city. In spite of Milwaukee's greater population, it would seem odd to find Milwaukee but not Washington labeled on a national map. To account for this, mapmakers often make adjustments to the priorities of cities, in order to make sure that cities that are more important than their populations would imply are displayed appropriately.

A difficulty in making these sorts of adjustments is that the mapmakers require knowledge about the politics and other cultural aspects of the country or region being mapped, and while it is relatively easy to determine that Washington is the capital of the United States, it is less obvious that Las Vegas, Nev. (population 478,434) is significantly more important from a mapping perspective than is Albuquerque, N. Mex. (population 448,607). While both Las Vegas and Albuquerque are approximately the same size, Las Vegas is a major American tourism center (and thus is often searched for on a map), while Albuquerque is not.

Now that an increasing number of maps are being produced using computers, it is desirable to automate the determination of which cities should be included without relying solely on population data and without requiring that the mapmakers have extensive political and cultural knowledge of the area being mapped.

SUMMARY OF THE INVENTION

The present invention enables automatic map generation by assigning priorities to each city in a list of cities under consideration for display on a map. A mapping engine determines a reference count for each city, the reference count indicating how frequently the city appears in one or more corpora of documents. The corpus of documents itself is chosen as appropriate for the intended use of the map. Based on the reference count, and optionally upon other data such as population and political importance, a priority score is assigned to each city. Each city is then assigned to one of a plurality of categories according to the city's priority score. A map is then generated including cities from a specified highest number of categories. In one embodiment, cities from a higher-scored category are presented in a more significant way, e.g., in capital letters, bold type, etc., than are those in the next-highest scored category. In an alternative embodiment, cities are placed on the map without being assigned to categories. In this embodiment, a specified number of cities, e.g., the 10 cities with the highest priority scores, or the top 40, or the top 60, etc., are placed on the map. Alternatively, a top percentage of cities can be placed on the map, or in yet another alternative, a user can vary the number of cities placed on the map in real time to suit his preference.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
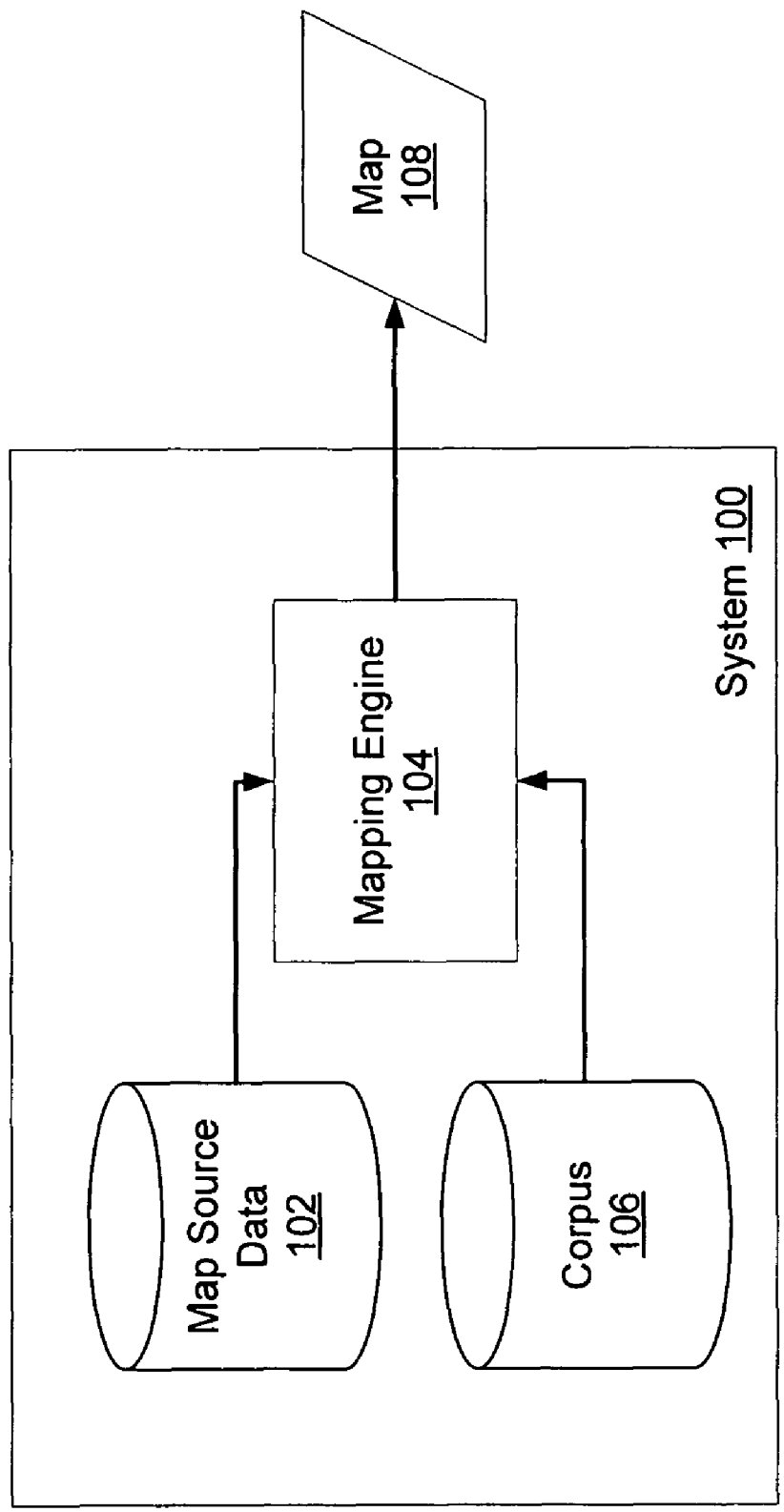
FIG. 1 is a block diagram illustrating a system for automatically generating maps in accordance with an embodiment of the present invention.

Referring now to FIG. 1, there is shown a system 100 for automatically generating maps in accordance with an embodiment of the present invention. System 100 includes a mapping engine 104; map source data store 102; and a corpus 106. Also shown is an output map 108. Map 108 in one embodiment is a paper or other physical map; in an alternative embodiment, map 108 is provided electronically, e.g., on a web page. The functionality of the mapping engine is described below with respect to FIG. 2.

Map source data 102 includes a list of cities and attributes of each city. In one embodiment, attributes include location and population. In another embodiment, attributes also include additional data about each city, such as whether it is the capital of the country or a region, etc. Map source data 102 can originate from a variety of sources, such as a census bureau, ministry of commerce, post office, commercial vendor, etc.

Typically, there are more cities included in source data 102 than can be accommodated by the map 108 because of the map's size. Accordingly, a subset of the cities must be selected to place on the map 108, and subsets of that subset must be selected to be displayed with greater or lesser prominence. This selection is performed by mapping engine 104.

Mapping engine 104 assigns priorities to each city in the map source data 102. Priorities are determined according to the frequency with which cities occur in the corpus of documents 106. The corpus of documents 106 is chosen as appropriate for the intended use of the map. For example, in building a map for general use on the World Wide Web, corpus 106 preferably includes a set of Web pages indexed by a search engine. The number of references to a city in the corpus 106 can be determined, e.g., by performing a search for a string of the form "<city name>, <state abbreviation>" or "<city name>, <state name>". There are several known methods for performing searches for terms in a corpus, and any can be used by system 100 to obtain a count for the frequency of each city in the corpus 106. In one embodiment, the metric used by mapping engine 104 is the number of pages that include the city name. In an alternative embodiment, the count is the number of occurrences of the city name—that is, a city that appears twice in a page is counted twice, whereas in the previous embodiment it is counted only once.

In another embodiment, system 100 is used to build a map 108 for use on a web site that provides news. In such an instance, the corpus 106 includes archives of news stories. Consequently, the map 108 generated by mapping engine 104 will include cities in which news happens (or is reported on) more often.

In another embodiment, map 108 is generated for use on a Web site devoted to a specialized topic of interest, e.g., California history. In this embodiment, mapping engine 104 searches a corpus of documents relating to California history and counts the number of references to each city. As an additional example, in building a map for reference within a company, the corpus 106 can consist of the customer list and each customer located in a city can be counted as a reference for that city.

Once determined, the reference count—i.e. the number of times each city is counted in the corpus—is used by mapping engine 104 to determine a priority order, i.e. an ordered list of cities sorted by importance. In one embodiment, the priority order is obtained by combining a reference count c of each city with a population p by multiplying each by some constant, $k_1$ and $k_2$, respectively, and adding the results, resulting in a priority score $k_1 \times c + k_2 \times p$. In an alternative embodiment, the priority score is obtained by performing the same operation with the logarithms of these numbers ($k_1 \times \log c + k_2 \times \log p$). Mapping engine 104 then preferably sorts the cities in order of descending priority score, i.e., considering cities with a greater priority score to be more important, breaking ties in an arbitrary manner. In an alternative embodiment, mapping engine 104 sorts the cities in order of ascending priority score.

In another embodiment, each city is ranked solely according to its population, and again solely according to its reference count. For example, in generating a map of the United States, if Washington, D.C. is the most frequently-mentioned city in corpus 106, its rank is 1 with respect to reference count. Washington is the 21st most populous city in the United States, so its rank is 21 with respect to population. These rank numbers are then combined to obtain a final priority score based on the combined rankings. For example, they may be combined simply by taking the lesser of the two numbers, so that both New York (which has rank of 1 with respect to population) and Washington (which has a rank of 1 with respect to reference count) have a priority score of 1. Alternatively, the rank numbers may be weighted prior to being combined, in a manner similar to that described above for combining population and reference count. After the rank numbers are combined, mapping engine 104 then sorts the cities by priority score.

In another embodiment, cities are ordered in decreasing order by reference count, without considering population. Using the formula described above, this can be expressed as $k_1 \times c + k_2 \times p$, where $k_1 = 1$ and $k_2 = 0$.

In a preferred embodiment, each city is assigned to one of a plurality of categories according to the city's rank. The rank threshold between categories can be assigned in a variety of ways. For example, the rank thresholds in one embodiment are determined at the outset, e.g., the 10 highest-ranked cities are assigned to the first category, the next 40 to the second category, etc. Alternatively, a percentage threshold is used, e.g., the top-ranked 1% of the cities are assigned to the first category, the next-ranked 4% of the cities to the second category, etc. In another embodiment, the rank thresholds are determined by the user according to his taste.

Figure 2:
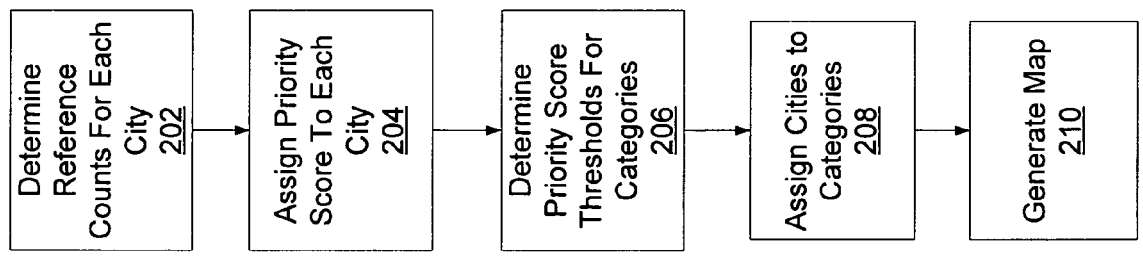
FIG. 2 is a flowchart illustrating a method for automatically generating maps in accordance with an embodiment of the present invention.

Referring now to FIG. 2, there is shown a flowchart illustrating a method for automatically generating maps in accordance with an embodiment of the present invention. First, mapping engine 104 determines 202 a reference count for each city in map source data 102 as described above. A priority score is then assigned 204 to the city by combining its population and its reference count, or its population rank and its reference count rank, as described above. Next, mapping engine 104 determines 206 a priority score threshold for each category. As described above, thresholds can be assigned either automatically or by the user. Using the determined thresholds, mapping engine 104 then assigns 208 each city to a category. Finally, mapping engine 104 generates 210 a map 108, including cities assigned to the top categories. In an alternative embodiment, cities are not assigned to categories, and mapping engine 104 generates map 108 by selecting the n most frequently occurring cities in the corpus 106 and including them on the generated map 108.

In an alternative embodiment, two or more different corpora are used to obtain reference counts. The reference count for each city and from each corpus is weighted and then combined with the reference counts from the additional corpora, and optionally population, to determine a priority score. Alternatively, rankings can be determined for each city relative to each corpus according to the manner described above for a single corpus and then combined, optionally with population ranking.

Although described so far in the context of locating cities on a map, the present invention also has application to locating other kinds of objects on a map—counties, countries, parks, airports, etc. That is, any entity for which references can be counted in a corpus can be mapped by system 100 according to the methods described above.

In an alternative embodiment, the age of documents in the corpus 106 influences the reference count of a city. If newer documents in the corpus are more important than older documents, a sliding scale is used in which references in newer documents count more heavily than those in older documents. In one embodiment, a reference in a document that is t days old is counted as $ce^{-kt}$ references, where c and k are constants and e is the base of natural logarithms.

In an alternative embodiment, corpus 106 includes queries to a search engine, so that a large number of queries about a city causes a large reference count, even if there are not many references to the city in the corpus.

The present invention provides a way of frequently and automatically redrawing a map for convenient reference.

Suppose, for example, that a news-related Web site provides a map of the United States for reference by visitors to its site. The prioritization of cities in map source data 102 by mapping engine 104 is preferably automated using a count of references in a corpus 106 of recent news stories as the reference count, and the map 108 is redrawn automatically at specified intervals, for example, weekly or nightly, or even on demand. If a news story takes place in an otherwise unimportant city— say, Victorville, Calif.—the number of references to that city will increase, and the increased number of references will literally put the city on the map, automatically.

In one embodiment, the corpus 106 is further restricted to include only web pages written in a certain language or languages. So, for example, a corpus of French-language documents can be used to prioritize cities on a map of Spain, thus showing those Spanish cities that are important to speakers of French.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of counting references, generating a priority score, and sorting the score and so forth may be provided in many modules or in one module.

Some portions of the above description present the feature of the preferred embodiments of the present invention in terms of algorithms and symbolic representations of operations on information. These algorithmic descriptions and representations are the means used by those skilled in the art of computerized cartography to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method for automatically generating a map, the method comprising:
   determining, by a computer, a frequency with which each of a plurality of city names occurs in a corpus of documents;
   associating, by the computer, each city name with one of a plurality of city categories according to the determined frequency of the city name in the corpus; and
   generating, by the computer a digital map including the city names, wherein an appearance of each city name on the map is determined by the category with which it is associated.

2. The computer-implemented method of claim 1 wherein the appearance on the map of city names associated with a first category is larger than the appearance on the map of city names associated with a second category.

3. The computer-implemented method of claim 2 wherein cities associated with the first category have a population greater than cities associated with the second category.

4. The computer-implemented method of claim 1 wherein the corpus of documents includes a set of web pages indexed by a search engine.

5. The computer-implemented method of claim 4 wherein the frequency of the city name in the corpus is the number of web pages that include the city name.

6. The computer-implemented method of claim 4 wherein the frequency of the city name in the corpus is the number of occurrences of the city name in the set of web pages.

7. The computer-implemented method of claim 1 wherein the corpus of documents includes a set of news stories.

8. The computer-implemented method of claim 1 further comprising:
   determining a population of the city identified by each city name; and
   wherein associating each city name with the city category further includes associating each city name with the category according to the determined frequency of the city name in the corpus and the population of the identified city.

9. A system for automatically generating a map, the system comprising:
   a processor;
   a map source data module, executed by the processor, including a list of city names to be identified on a map; and
   a mapping engine, executed by the processor, for:
      associating each city name with a city category according to a determined frequency with which the city name occurs in a corpus of documents; and
      generating a map including the city names, wherein an appearance of each city name on the map is determined by the category with which it is associated.

10. A computer program product for automatically generating a map, the computer program product stored on a computer-readable storage medium and including executable program code configured to cause a processor to carry out the steps of:
   determining a frequency with which each of a plurality of city names occurs in a corpus of documents;
   associating each city name with a city category according to the determined frequency of the city name in the corpus; and
   generating a map including the city names, wherein an appearance of each city name on the map is determined by the category with which it is associated.

11. A method for labeling objects on a digital map, the method comprising:
   determining, by a computer, a reference count for each of the objects with respect to a corpus of documents, the reference count indicating a frequency with which the object appears in the corpus;
   associating, by the computer, a priority with each of the objects according to the reference count for the object; and
   rendering, by the computer, a digital map including at least some of the objects, each object including a label, the label having an appearance reflecting the priority associated with the labeled object.

12. The method of claim 11 wherein a first object having a first priority includes a label having a bold appearance, and a second object having a second priority lower than the first priority includes a label not having a bold appearance.

13. The method of claim 11 wherein each object is a city.

14. The method of claim 11 wherein each object is a county.

15. The method of claim 11 wherein each object is an airport.

16. A method for labeling cities on a digital map, the method comprising:
   determining, by a computer, a priority score for each of a plurality of cities, the priority score determined according to a frequency with which the city appears in a corpus of documents;
   categorizing each city, by the computer, according to its determined priority score; and
   rendering, by the computer, a digital map including at least some of the cities, each included city having a label with an appearance determined at least in part by the category to which the city belongs.

17. The method of claim 16 wherein cities having a priority score lower than a threshold amount are not included in the rendered map.

18. The method of claim 17 wherein the threshold is variable according to input from a user.

19. The method of claim 16 wherein the documents in the corpus are web pages.

20. The method of claim 16 wherein the documents in the corpus are customer records, each customer record including a city in which the customer is located.

21. The method of claim 16 wherein determining the priority score for a city further comprises weighting the frequency with which the city appears in the corpus according to a population of the city.

22. The method of claim 16 wherein each document in the corpus has an age, and determining the priority score for a city further comprises weighting the score according to the age of the documents in which the city occurs.

23. The method of claim 16 wherein the corpus includes queries to a search engine.

24. The method of claim 16 in which each document in the corpus is written in the same language.

* * * * *